United States Patent
Norris et al.

(10) Patent No.: US 6,229,899 B1
(45) Date of Patent: *May 8, 2001

(54) METHOD AND DEVICE FOR DEVELOPING A VIRTUAL SPEAKER DISTANT FROM THE SOUND SOURCE

(75) Inventors: Elwood G. Norris; James J. Croft, III, both of Poway, CA (US)

(73) Assignee: American Technology Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/159,443

(22) Filed: Sep. 24, 1998

Related U.S. Application Data

(63) Continuation-in-part of application No. 08/684,311, filed on Jul. 17, 1996, now Pat. No. 5,889,870.

(51) Int. Cl.[7] ....................................................... H04B 3/00

(52) U.S. Cl. ............................................... 381/77; 381/79

(58) Field of Search ................................ 381/77, 79, 82, 381/160

(56) References Cited

U.S. PATENT DOCUMENTS

| | | | |
|---|---|---|---|
| 1,616,639 | * 2/1927 | Sprague | ................................. 381/77 |
| 4,823,908 | 4/1989 | Tanaka et al. . | |
| 4,908,805 | 3/1990 | Sprenkels et al. . | |
| 5,357,578 | 10/1994 | Taniishi . | |
| 5,889,870 | * 3/1999 | Norris | ................................... 381/79 |

FOREIGN PATENT DOCUMENTS 2-265397   10/1990   (JP) .

OTHER PUBLICATIONS

Masahide Yoneyama, Jun–ichiroh Fujimoto, Yu Kawamo, Shoichi Sasabe "Audio Spotlight: An Application of Nonlinear Interaction of Sound Waves to a New Type of Loadspeaker Design" J. Acoustical Society of America 73(5), May 1983, pp. 1532–1536.

H. O. Berktay, T.G. Muir "Arrays of Parametric Receiving Arrays" The Journal of the Acoustical society of America, pp. 1377–1383.

Kenichi Aoki, Tomoo Kamakura, Yoshiro Kumamoto "Parametric Loudspeaker—Characteristics of Acoustic Field and Suitable Modulation of Carrier Ultrasound" Electronics and Communications in Japan, Part 3, vol. 74, No. 9, 1991, pp. 76–80.

* cited by examiner

*Primary Examiner*—Minsun Oh Harvey
(74) *Attorney, Agent, or Firm*—Thorpe North & Western, LLP

(57) ABSTRACT

A method for providing multiple speaker locations around a listener in a room with a sound source at a single location. The method comprising the steps of a) generating primary audio output by emitting audio compression waves from audio speakers at the sound source which are oriented along a primary audio path directly toward the listener; b) generating secondary audio output from at least one virtual speaker remote from and electronically unconnected with the sound source by emitting ultrasonic sound from at least one parametric speaker positioned at the sound source and oriented toward at least one reflective surface within the room which is remote from the sound source and not along the primary audio path, thereby indirectly generating omnidirectional sound from the reflective surface which is perceived as originating at the virtual speaker; and c) synchronizing the primary audio output of the audio speakers with the secondary audio output from the at least one parametric speaker such that the listener hears a unified sound experience from multiple directions.

14 Claims, 1 Drawing Sheet

METHOD AND DEVICE FOR DEVELOPING A VIRTUAL SPEAKER DISTANT FROM THE SOUND SOURCE

The present invention is a continuation-in-part of Ser. No. 08/684,311, filed Jul. 17, 1996, now U.S. Pat. No. 5,889,870.

BACKGROUND OF THE INVENTION

1. Field of the Invention

The present invention relates to sound systems, and more particularly to sound systems which provide a sense of three-dimensional depth in listening experience.

2. Prior Art

The evolution of sound reproduction began with a simple sound source such as a horn loudspeaker acoustically coupled to a rotating cylinder which carried physical impressions of sound scribed into its surface. The emitted sound was very localized, propagating from the horn with a directional aspect oriented along the horn throat axis. As speakers became more sophisticated, stereophonic features were added in combination with use of multiple speaker systems, generating left and right or side-to-side dynamics to sound reproduction. Modem surround sound systems capitalize on diverse speakers to generate both stereophonic and multi-channel output, as well as synchronized shifting of isolated sounds to individual speakers disposed around the listener. In this manner, for example, sound associated with motion picture display can develop greater realism by coordinating specific events on the screen with shifting sound propagation around the room from a variety of directions.

Because of the physiology of the ear, human hearing is amazingly capable of assigning a directional aspect to sound. This ability provides a continuous flow of information to the brain, supplying data which is assimilated in defining an individual's position and environment within a three-dimensional framework. Modem surround sound systems simulate a desired three-dimensional environment by directing sound to the listener from various orientations, including front, side, back, floor and ceiling propagation. Such sounds include speaking voices from persons at differing positions, surrounding environmental sounds of nature such as water movement, wind, thunder, birds, animals, etc. Action scenes include synthesized audio effects for emphasizing mood dynamics of anxiety, fear, surprise, and pleasure, as well as sound effects for crash scenes, explosions, and a myriad of visual objects whose display on the screen is brought to life with multidirectional sound effects.

In order to implement effective surround sound experience as described above, conventional sound systems include many speakers, positioned around a room perimeter, including floor and ceiling. Typically, low range woofers are located at the front of the room, or under the floor. Because these low frequency speakers have less directionality, their location at the front of a room is not problematic. Indeed, the low range sound is difficult to ascribe to any direction when the room is reasonably small in dimension. Because of the large size of conventional dynamic speakers, location in the front of the room is generally more practical.

With increasing frequency, directional aspect of sound propagation is enhanced. Tweeters, for example, can readily be detected as to source or orientation. Surround sound systems supply these higher frequencies from smaller speakers which are dispersed at the sides and back of the room, enabling their beaming properties to simulate sound emanating from multiple directions as if in a natural environment. Physical displacement and positioning at wall and ceiling locations is facilitated by the smaller size of this speaker component.

Parametric speakers are also known for their highly directional character. U.S. Pat. No. 4,823,908 of Tanaka et. al. discloses that the derivation of audio output from a modulated ultrasonic carrier provides a more focused directivity, even at lower frequency ranges. FIG. 2 of this patent shows a conventional parametric system 8 oriented directly toward a listener 9. Acoustic filters 10 and 20 or other acoustic absorbing material are therefore applied along the audio path between the emitter and listener for substantially eliminating the ultrasonic component of the parametric output. Although reflective plates 19 are disclosed in Tanaka et. al. (i.e. FIG. 16), their sole purpose appears to be for lengthening the acoustic path and changing the direction of propagation of the ultrasonic and audio frequencies. Accordingly, prior art teachings with respect to parametric speakers do not distinguish any significant difference between audio output between direct projection of parametric output toward a listener and indirect propagation of such audio output to a listener by reflection, except perhaps enhanced db level.

In accordance with this understanding, prior art systems for developing perception of sound sources from different directions would necessitate the placement of a speaker along a particular orientation and at a predetermined location. In order to obtain multiple directions as part of a surround sound experience, multiple speakers (dynamic, electrostatic, parametric, etc.) at differing locations would be required.

Therefore, the need to disperse speaker systems at a variety of positions within the listener's experience generally necessitates more complex technical implementation. Speaker wires must extend from sound source to speaker hardware. For in-home theaters, retrofit of wiring may be expensive and/or detrimental to room decor. Efforts to avoid unsightly wiring may include FM wireless transmission systems which are very expensive and often problematic in operation. Even where new construction allows prewiring of surround sound systems, limited adaptability exists because the speakers are fixed at certain locations, and are not subject to rapid relocation consonant with displacement of the sound. If a sense of movement is desired based on shifting sound source, many speakers are required along the direction of movement, with complex crossover circuitry to synchronize sound through the desired speaker devices. In short, the excessive cost and complexity of dynamic movement of the sound source has discouraged general commercial application in environments other than public move theaters.

OBJECTS AND SUMMARY OF THE INVENTION

It is therefore an object of this invention to enable implementation of a surround sound experience from a sound source positioned at one location in a room.

It is a further object of this invention to provide virtual speaker sources from various reflecting surfaces of a room to give a multidirectional sound experience.

Yet another object of this invention is to provide multi-channel sound from a single location, but with three-dimensional aspect to the listener.

A still further object of this invention is the development of virtual sound sources which can be readily moved about a reflective surface.

A further object of this invention is enablement of surround sound speaker positioning without the need for wiring remote speaker devices to a sound control system.

These and other objects are realized in a method for providing multiple speaker locations around a listener in a room with on a sound source at a single location. The method comprising the steps of a) generating frontal audio output by emitting audio compression waves from audio speakers at the sound source which are oriented along a primary audio path directly toward the listener; b) generating nonfrontal audio output from at least one virtual speaker remote from and electronically unconnected with the sound source by emitting ultrasonic sound from at least one parametric speaker positioned at the sound source and oriented toward at least one reflective surface within the room which is remote from the sound source and not along the primary audio path, thereby indirectly generating omnidirectional sound from the reflective surface which is perceived as originating at the virtual speaker; and c) synchronizing the frontal audio output of the audio speakers with the nonfrontal audio output from the at least one parametric speaker such that the listener hears a unified sound experience from multiple directions.

The present invention is further represented by a device for providing multiple speaker locations around a listener in a room with on a sound source at a single location. The device includes frontal audio speakers coupled to the sound source which are adapted for orientation along a primary audio path directly toward the listener, and at least one parametric speaker positioned at the sound source and oriented toward at least one reflective surface within the room which is remote from the sound source and not along the primary audio path. The at least one parametric speaker provides nonfrontal audio output for developing at least one virtual speaker remote from and electronically unconnected with the sound source. In addition, a synchronizing circuit is provided for coordinating the frontal audio output of the audio speakers with the nonfrontal audio output from the at least one parametric speaker such that the listener hears a unified sound experience from multiple directions.

Other objects and features of the present invention will be apparent to those skilled in the art, in view of the following detailed description, taken in combination with the accompanying drawings.

DETAILED DESCRIPTION OF THE INVENTION

It is well known that parametric speakers provide a highly directional beam of ultrasonic frequency emission which, when modulated with an audio signal, creates multiple ultrasonic frequencies. In accordance with principles of acoustic heterodyning, two ultrasonic frequencies whose difference falls within the audio range will interact in air as a nonlinear medium to produce an audio difference tone. This phenomenon produces an audio sound column including the modulated audio signal which is also highly directional. An explanation of theoretical principles relating to parametric speakers can be found in "Audio spotlight: An application of nonlinear interaction of sound waves to a new type of loudspeaker design" by Yoneyama et al as published in the *Journal of Acoustic Society of America,* 73(5), May 1983.

Figure 1:
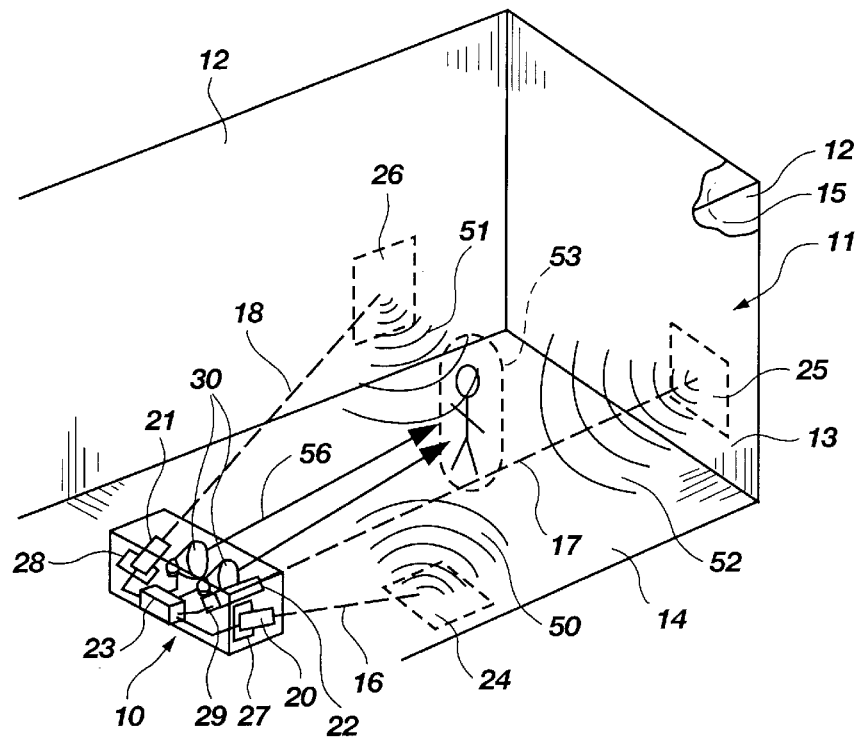
FIG. 1 graphically illustrates a perspective view of a preferred embodiment of the present invention in the form of a home theater.

In accordance with the present invention, parametric speakers can be used and/or combined with a conventional sound system such as is shown in FIG. 1 to provide virtual speakers which will be perceived as sound sources at the various points of reflection of the ultrasonic beams. When applied as part of a surround sound system, the parametric speakers eliminate the need for positioning actual speakers at the various separate locations desired for multiple sound sources. This eliminates troublesome wiring connections previously required to link distant speakers with the sound source.

FIG. 1 illustrates a conventional sound system 10 positioned at a frontal location in a typical room or enclosure 11. The preferred embodiment of this invention is incorporated as part of a home theater system incorporating video in combination with numerous audio effects including shifting directions of source. Room dimensions will obviously vary with construction requirements, but are represented by width and length dimensions of approximately 15×20 feet. Two opposing side walls are represented by side wall 12, separated by a back wall 13. The floor of the room is shown as item 14, and a ceiling 15 is partially exposed to illustrate its utility with the present invention.

The sound system 10 includes parametric speakers 20, 21 and 22. Ultrasonic sound control circuitry is housed in the audio amplifier system 23, along with all other sound system components which power the conventional speakers 30. Each speaker includes alignment structure 27, 28 and 29 for directing each parametric device toward reflective areas which operate as desired virtual speaker positions 24, 25 and 26. These reflective areas have been represented by enclosed regions within phantom lines; however, these boundaries are merely suggestive of surface areas on the floor, back wall, ceiling and side walls and may be shifted to virtually any reflective region which will provide the desired orientation of sound source to the listener. It should be noted that the virtual speaker of the present invention can also be applied in other environments where a reflective surface can be provided, such as an outdoor arena or partial enclosure.

Figure 2:
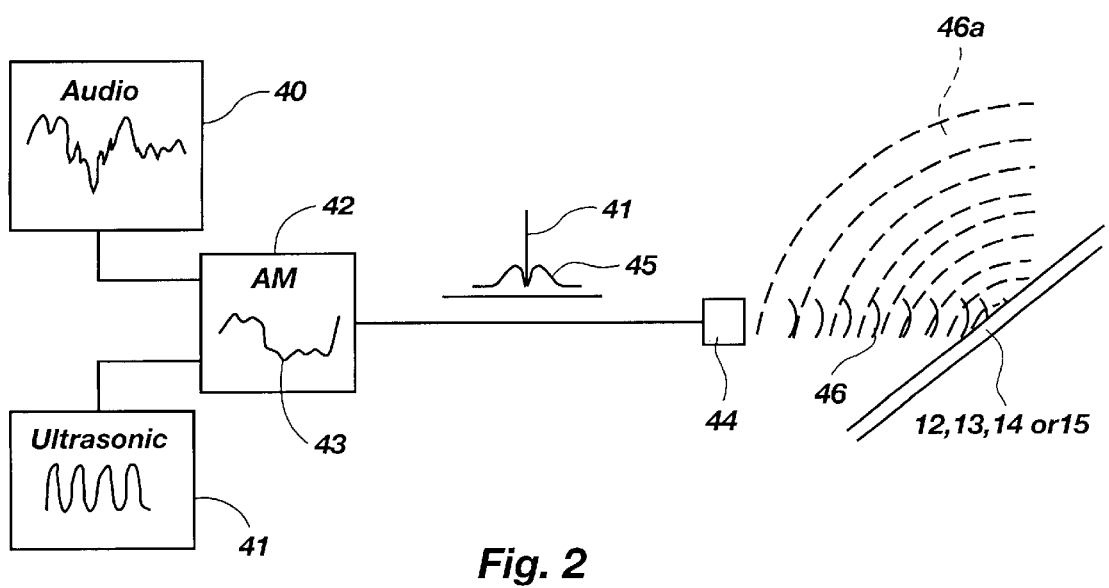
FIG. 2 provides a block diagram of the system for implementing the present invention.

The specific process of realizing the virtual speaker location begins with emission of a heterodyning sound column in accordance with procedures outlined in the paper of Yoneyama et al referenced above. This process is generally represented in FIG. 2 and involves the mixing of (i) desired audio signal 40 which is to be projected to the reflective surface, with (ii) an ultrasonic carrier wave 41, typically within the range of 40 to 60 Khz, by means of amplitude modulation 42 or other appropriate process to generate a combined wave form 43 comprising the carrier wave and one or more sidebands 45. This signal of two or more ultrasonic frequencies whose difference in value corresponds to the audio input is projected into surrounding air by an ultrasonic emitter 44 and is decoupled as audio output 46 by the air as a nonlinear medium. Because of the highly directional nature of such parametric speakers, listeners outside the general direction of ultrasonic projection will not hear the emitted audio sound waves until reflected from wall, floor or ceiling 12, 13, 14 or 15. Once reflected, however, the sound disperses in a generally omnidirectional pattern 46a, with the apparent source of the sound being the reflected surface which is typically distant from the actual emitter source.

It will be apparent, therefore, that the location of the virtual speaker 24, 25, or 26 will be a function of the directional orientation of the parametric speakers 20, 21, or 23. Such orientation may be fixed where the system is designed to service a particular audience with predetermined audio/visual material, or may be controlled by alignment devices or servo systems 27, 28, or 29 which are coupled to the respective emitters. Such systems may be mechanical pivoting devices or beam steering circuits which alter the perceived propagation path of sound based on changing the phase relationship between groups of emitters within the parametric speaker. Perception of movement may also be accomplished by varying the intensity of sound between speakers so that a shifting perspective is achieved as sound intensity migrates from one speaker to another. Other methods in addition to the three cited techniques for developing movement of the parametric output will be apparent to those skilled in the art. Alignment with desired orientation would then be a function of providing positional data to the servo system either by preprogrammed control signals which are coordinated with a specific audio or visual presentation, or other form of responsive control.

It will be recognized that the present invention operates in a two stage process. The first stage involves the generation and control of a focused beam of energy comprising the ultrasonic carrier signal with attendant sideband signal for generation of the sound column. At this stage, the sonic energy needs to be narrow, rather than diffuse in propagation. Actual frequency of the carrier signal will be a function of desired distance from the emitter to the reflective surface. Inasmuch as lower ultrasonic frequencies provide longer range, the preference for 40 to 60 Khz has been stated. In as much as a given transducer may offer stronger power output at higher frequencies, ultrasonic energy absorption graduates rapidly with frequencies over 100 Khz.

The second stage of the process is to convert the focused beam of sound to a diffuse, omnidirectional pattern, and to do this at a distance from the actual sound source. Although the first stage of development appears to be discussed in the Tanaka et al patent, the achievement of an omnidirectional diffusion source at a distance from the sound source is undisclosed. Instead, Tanaka et al suggests use of parametric emitters which are configured with diffuse propagation, which is then reflected such as by a parabolic surface into collimated form. Tanaka et al further imposes an acoustic filter at the reflective surface, or otherwise in the propagation path, to attenuate ultrasonic radiation. It appears that Tanaka et al and parametric disclosures do not develop what the present inventor has discovered to be an interesting phenomenon of parametric speakers involving configuration for achievement of a "virtual speaker" distant from the actual parametric source. This apparently arises in part when a parametric sound column is reflected in omnidirectional manner at a distant reflective surface which is not otherwise inhibited by acoustic filter material. This reflection has the effect of defining the apparent source of the virtual speaker because the human ear is accustomed to associating an omnidirectional sound source as being the natural center of evolution for emanating sound.

For example, as a collimated, parametric sound output beam 16, 17 or 18 encounters the reflective wall 12 or 13, floor 14 or ceiling 15 surface, it has been observed that the focused beam actually converts to the desired omnidirectional pattern 50, 51, or 52 as illustrated in FIG. 1. Normal auditory senses now ascribe the various reflecting sound waves of omnidirectional nature arriving at the listener to be associated with the virtual speaker. Sound emissions from the parametric output of the first stage do not interfere with this sensory process because they remain in the focused columns 16, 17 and 18 which are oriented to be outside the listener location 53.

This specific process is represented in the following general method for providing multiple speaker locations around a listener in a room having a sound source being positioned at a single location. This method includes the initial step of a) generating primary audio output by emitting audio compression waves from audio speakers 30 at the sound source 10 which are oriented along a primary audio path 56 directly toward the listener location 53. This is consistent with a conventional sound system, and would generally include a full range speaker array having woofer, midrange, and tweeter devices oriented toward the user. Such sound would project toward the user, and would be generally reflected throughout the room. In this configuration, all sound would be perceived as emanating from the sound source 10.

A concurrent step of the process includes generating secondary audio output 51, 52, and/or 53 from at least one virtual speaker 24, 25 and/or 26 remote from and electronically unconnected with the sound source. This is accomplished as described above by emitting ultrasonic sound from at least one parametric speaker 20, 21, and/or 22 positioned at the sound source and oriented toward at least one reflective surface within the room which is remote from the sound source and not along the primary audio path, thereby indirectly generating omnidirectional sound 50, 51, and/or 52 from the reflective surface which is perceived as originating at the virtual speaker.

Synchronizing the primary audio output 56 of the audio speakers with the secondary audio output 16, 17, and 18 from the at least one parametric speaker may be necessary or desired such that the listener hears a unified sound experience from multiple directions. For example, distances of the primary audio path 56 will need to be coordinated with the greater distances traveled by the sound columns 16, 17, 18 and omnidirectional paths 50, 51 and 52 to the listener location. Appropriate time delays can be implemented within the primary control circuitry of item 23. Similarly, synchronizing signals may be desired for isolated audio effects which are momentarily emitted at any one or more of the reflective surfaces to simulate a crash, bolt of lightening or other audio feature having a different directional component. These techniques are well known in the audio industry and do not require further explanation.

This basic method is typically implemented with advanced fidelity and multichannel features as part of the sound source. This multichannel format generally embodies the frontal audio output with at least one first channel, and the nonfrontal audio output with at least one second channel. Normally the multichannel format includes two or more separate channels of multichannel sound for both the frontal audio output and the nonfrontal audio output. These multiple channels are used to provide division of left-right multichannel output, front-back multichannel output, and isolation of audio features which may be spread across reflective surfaces throughout the room.

As part of this method, various combinations of conventional speaker and virtual speaker selection may easily be accomplished as a choice of electronic control and activation through the control circuitry 23. These combinations are represented in part by a single virtual speaker at a side wall with respect to the primary audio path, a single virtual speaker at a back wall with respect to the primary audio path, a single virtual speaker at a ceiling surface or a single virtual speaker at a floor surface. Concurrent operation of virtual speakers at opposing side walls relative to the primary audio path, as well as virtual speakers at respective side and back walls relative to the primary audio path are part of a conventional surround system, and may be conveniently implemented with the present invention, along with any other combination of virtual speakers at a ceiling surface or floor surface. Parametric speakers may also be coupled directly to a video projection system suspended from a ceiling location within the room. Virtual speaker positions along various floor and side wall locations can readily be achieved from this ceiling position in response to alignment devices associated with the parametric emitters as previously discussed.

A more significant feature of the present invention is its ability to incorporate rapidly moving virtual speaker locations along any of these reflective surfaces. For example, lateral movement of the parametric device 20, 21, or 22 develops a concurrent displacement of the virtual speaker along the reflective surface and will provide a sensation of motion for the listener. When combined with a video projection system, these nonfrontal audio output features can be coordinated with events represented on a video display. A streaking jet, roaring train or exciting car chase can be enhanced with directional sound from many orientations which emphasize a full range of dynamic activity. This not only generates an excillerating sensory response with the listener, but enlarges the experience with a three-dimensional sense of depth within the room.

It is to be understood that the foregoing illustrations are offered as examples of the versatility of the present invention, and are not intended to be limiting, except as defined in the following claims.

We claim:

1. A method for providing at least one virtual speaker location around a listener in a room or other at least partial reflective environment with a sound source at a single location, said method comprising the steps of:
   a) generating a primary audio output by emitting audio compression waves from audio speakers at the sound source which are oriented along a primary audio path directly toward the listener;
   b) generating secondary audio output from at least one virtual speaker remote from and electronically unconnected with the sound source by emitting ultrasonic sound from at least one parametric speaker positioned at the sound source and oriented toward at least one reflective surface which is remote from the sound source and not along the primary audio path, thereby indirectly generating substantially omni-directional sound from the reflective surface which is perceived as a virtual speaker; and
   c) synchronizing the primary audio output of the audio speakers with the secondary audio output from the at least one parametric speaker such that the listener hears a unified sound experience from multiple directions.

2. A method as defined in claim 1, comprising the more specific step of providing the sound source with multichannel format wherein the primary audio output comprises at least one first channel, and the secondary audio output comprises at least one second channel.

3. A method as defined in claim 2, comprising the more specific step of providing a multichannel format wherein the primary audio output includes two separate channels of multichannel sound, and the secondary audio output comprises at least two channels of multichannel sound separate from the channels of the primary audio output.

4. A method as defined in claim 1, comprising the additional step of positioning at least one virtual speaker at a side wall with respect to the primary audio path.

5. A method as defined in claim 1, comprising the additional step of positioning at least one virtual speaker at a back wall with respect to the primary audio path.

6. A method as defined in claim 1, comprising the additional step of positioning at least one virtual speaker at a ceiling surface.

7. A method as defined in claim 1, comprising the additional step of positioning at least one virtual speaker at a floor surface.

8. A method as defined in claim 1, comprising the additional step of concurrently operating at least two virtual speakers at opposing side walls relative to the primary audio path.

9. A method as defined in claim 1, comprising the additional step of concurrently operating a plurality of virtual speakers at respective side and back walls relative to the primary audio path.

10. A method as defined in claim 1, comprising the additional step of concurrently operating a plurality of virtual speakers at opposing side walls relative to the primary audio path and at a ceiling surface.

11. A method as defined in claim 1, comprising the additional step of concurrently operating a plurality of virtual speakers at opposing side walls relative to the primary audio path and at a floor surface.

12. A method as defined in claim 1, comprising the additional step of concurrently operating a plurality of virtual speakers at opposing side walls relative to the primary audio path and at opposing floor and ceiling surfaces.

13. A method as defined in claim 1, further comprising the step of providing lateral movement of the at least one virtual speaker along the reflective surface to provide a sensation of motion for the listener.

14. A method as defined in claim 1, comprising the additional steps of concurrently operating a video system in combination with the at least one virtual speaker and coordinating secondary audio output with events represented on a video display.

* * * * *